United States Patent
Ichikawa et al.

(10) Patent No.: US 9,296,305 B2
(45) Date of Patent: Mar. 29, 2016

(54) CHARGING APPARATUS FOR VEHICLES

(75) Inventors: Shinji Ichikawa, Aichi (JP); Naomi Okamura, Aichi (JP); Satoshi Tanaka, Aichi (JP); Atsuhisa Ando, Aichi (JP); Hiroyuki Okada, Aichi (JP); Hiroshi Suzuki, Aichi (JP); Yoshinori Aikawa, Aichi (JP); Shougo Inamori, Aichi (JP)

(73) Assignees: Toyota Jidosha Kabushiki Kaisha, Aichi (JP); Nitto Kogyo Corporation, Aichi (JP)

( * ) Notice: Subject to any disclaimer, the term of this patent is extended or adjusted under 35 U.S.C. 154(b) by 254 days.

(21) Appl. No.: 13/976,618

(22) PCT Filed: Dec. 26, 2011

(86) PCT No.: PCT/JP2011/080055
§ 371 (c)(1),
(2), (4) Date: Sep. 9, 2013

(87) PCT Pub. No.: WO2012/090928
PCT Pub. Date: Jul. 5, 2012

(65) Prior Publication Data
US 2014/0021918 A1    Jan. 23, 2014

(30) Foreign Application Priority Data

Dec. 28, 2010    (JP) ................................. 2010-292008

(51) Int. Cl.
| | |
|---|---|
| *H02J 7/00* | (2006.01) |
| *H02J 7/14* | (2006.01) |
| *B60L 11/18* | (2006.01) |
| *H01M 10/44* | (2006.01) |
| *H02J 7/02* | (2006.01) |

(52) U.S. Cl.
CPC ........... *B60L 11/1824* (2013.01); *B60L 11/184* (2013.01); *B60L 11/1816* (2013.01); *B60L 11/1838* (2013.01); *H01M 10/44* (2013.01); *H02J 7/0004* (2013.01); *H02J 7/02* (2013.01); *Y02T 10/7005* (2013.01); *Y02T 10/92* (2013.01); *Y02T 90/121* (2013.01); *Y02T 90/128* (2013.01); *Y02T 90/14* (2013.01); *Y02T 90/163* (2013.01)

(58) Field of Classification Search
CPC .................................................... Y02T 10/7005
USPC ......................................................... 320/104
See application file for complete search history.

(56) References Cited

U.S. PATENT DOCUMENTS

| | | | |
|---|---|---|---|
| 5,952,813 A | * | 9/1999 | Ochiai .......................... 320/104 |
| 7,477,038 B2 | * | 1/2009 | Taniguchi ..................... 320/104 |

(Continued)

FOREIGN PATENT DOCUMENTS

| | | |
|---|---|---|
| EP | 2234238 A1 | 9/2010 |
| JP | 9233712 A | 9/1997 |
| JP | 200971899 A | 4/2009 |

(Continued)

*Primary Examiner* — Suresh Memula
(74) *Attorney, Agent, or Firm* — The Webb Law Firm

(57) ABSTRACT

Provided is a charging apparatus for vehicles which charges a vehicle provided with a charging control circuit via a charging cable, comprising a charging control device which controls electrical charging to the vehicle by transmitting a charging control signal to the charging control circuit on the vehicle side, a charging control signal transmission restricting device which restricts transmission of the charging control signal, and a resetting device which forcibly resets the charging control signal when said restriction on transmission of the charging control signal is withdrawn.

5 Claims, 5 Drawing Sheets

(56) References Cited

U.S. PATENT DOCUMENTS

| | | | |
|---|---|---|---|
| 7,719,232 B2 * | 5/2010 | Kelty et al. | 320/132 |
| 2010/0268406 A1 | 10/2010 | Ito et al. | |
| 2010/0295507 A1 | 11/2010 | Ishii et al. | |
| 2011/0057611 A1 * | 3/2011 | Nakaso et al. | 320/109 |
| 2012/0074903 A1 | 3/2012 | Nakashima | |

FOREIGN PATENT DOCUMENTS

| | | |
|---|---|---|
| JP | 4332861 A | 7/2009 |
| JP | 20104674 A | 1/2010 |
| JP | 2010104133 A | 5/2010 |
| JP | 2010246320 A | 10/2010 |
| WO | 2010143482 A1 | 12/2010 |

* cited by examiner

CHARGING APPARATUS FOR VEHICLES

CROSS-REFERENCE TO RELATED APPLICATIONS

This application is a United States national phase under 35 U.S.C. §371 of International Application No. PCT/JP2011/080055 filed Dec. 26, 2011, entitled "Charging Apparatus for Vehicles", and claims priority under 35 U.S.C. §119(a)-(d) to Japanese Patent Application No. 2010-292008, filed on Dec. 28, 2010 in the Japanese Intellectual Property Office, which are hereby incorporated by reference in their entirety.

FIELD OF THE INVENTION

The present invention relates to a charging apparatus for vehicles to utilize for charging vehicles provided with in-vehicle batteries such as plug-in hybrid cars and electric cars, more specifically for charging vehicles corresponding to Mode 3 charging system.

BACKGROUND ART

With reference to electrical charging systems for plug-in hybrid cars, electric cars or the like, in which rapid diffusion is hereinafter expected, SAE (Society of Automotive Engineers) of the USA and JEVA (current JARI: Japan Automobile Research Institute) had determined standard systems. In such standard systems, a plurality of modes have been established. For example, there is a mode (Mode 1) which requires only a charging cable and an earth leakage breaking means as a ground side facility, or a mode (Mode 3) which further requires, as a ground side facility, a control means including a charging control means which transmits a charging control signal (CPLT: Control Pilot) to a charging control circuit on the vehicle side. Contents of such standard systems are described in the portion of Background art of Patent document 1.

In the case of the vehicle adopting Mode 3 in the above mentioned modes, an electrical charging starts after the charging control circuit on the vehicle side checks a connecting status of a charging cable and a charging status of an in-vehicle battery.

FIG. 4 illustrates a schematic circuit diagram relating to a charging start control in a charging apparatus 20 for vehicles corresponding to a vehicle 30 adopting Mode 3. FIG. 5 illustrates a graph showing variation of potential of point A (a charging control signal) of the charging apparatus 20 for vehicles of FIG. 4 according to the charging status. In the schematic circuit diagram of FIG. 4, the potential of point A (a charging control signal) of the charging apparatus 20 for vehicles is set at 12 volt on the condition that a charging cable 1 is not connected with the vehicle 30 corresponding to Mode 3.

The charging cable 1 is configured with a power cable 1a which constitutes a charging electrical line, an information cable (communication cable) 1b which transmits a charging control signal, and an earth cable 1c. When the charging cable 1 is connected with the vehicle 30, a resistor R2 of a charging control circuit 6 on the vehicle side is connected with a resistor R1 in series, thereby reducing voltage, then the potential of point A (a charging control signal) becomes 9V. A charging control portion 7 can detect mutual connection between the charging cable 1 and the vehicle 30 corresponding to Mode 3. After that, the charging control portion 7 makes an oscillator 10 oscillate so that it becomes 9V oscillating status. Accordingly the 9V pulse enters into the vehicle side and the charging start control circuit 6 on the vehicle side makes a receipt allowing switch 12 turned on. Consequently the potential of point A (a charging control signal) changes to 6V oscillation by reduction of voltage due to resistance of a resistor R3, so that preparation for receiving electrical power completes. On this condition, the charging control portion 7 outputs an ON signal to a relay 5, then charging electrical current flows through the charging electrical line 2, so that electrical charging to an in-vehicle battery 4 starts via a battery charger on the vehicle side.

The charging start control as mentioned above is performed by using an auxiliary battery used for other than driving on the vehicle side. However, there is a type of vehicles having a sleep mode function to stop power supply to the charging control circuit 6 for preventing the auxiliary battery of the vehicle 30 from running out if electrical charging does not start within a predetermined period of time after detecting mutual connection between the charging cable 1 and the vehicle 30. In case of restarting electrical charging to the vehicle from the sleeping mode, an operator needs to physically disconnect and reconnect the charging cable 1 in order to release the sleeping mode.

Relating to the charging apparatus 20 for vehicles, it is planned to have a timer control function for starting electrical charging after passing a predetermined period of time from the connection of the charging cable 1 in order to charge the vehicle 30 by using midnight power service with lower electrical utility rates, or to have a function to repeat start and stop of charging alternately in order to charge a plurality of vehicles by turns in multiple dwelling houses or the like. There was, however, a problem that such functions cannot substantially be utilized because the problems similar to the above occurs when the vehicle 30 having the sleeping mode function is connected with the charging apparatus 20 for vehicles.

Patent document 1: Japanese Unexamined Patent Publication No. 2009-71899 (Column of Background art)

SUMMARY OF THE INVENTION

An object of the present invention is to solve the above mentioned problems, that is, to provide a charging apparatus for vehicles wherein even if a vehicle having the sleeping mode function is connected with the charging apparatus for vehicles having the timer function in which electrical charging does not start immediately after the charging cable is connected with the vehicle by its control, or having a function to stop electrical charging temporarily, it is achievable to perform the timer function or the function to temporarily stop and restart electrical charging without physically disconnecting and reconnecting the charging cable by an operator.

In order to solve the above mentioned problems, one aspect of the charging device for vehicles according to the present invention is a charging apparatus for vehicles which charges a vehicle provided with a charging control circuit via a charging cable, including a charging control device which controls electrical charging to the vehicle by transmitting a charging control signal to the charging control circuit on the vehicle side, a charging control signal transmission restricting device which restricts transmission of the charging control signal, a resetting device which forcibly resets the charging control signal when said restriction on transmission of the charging control signal is withdrawn.

DETAILED DESCRIPTION OF THE INVENTION

General Description

Figure 1:
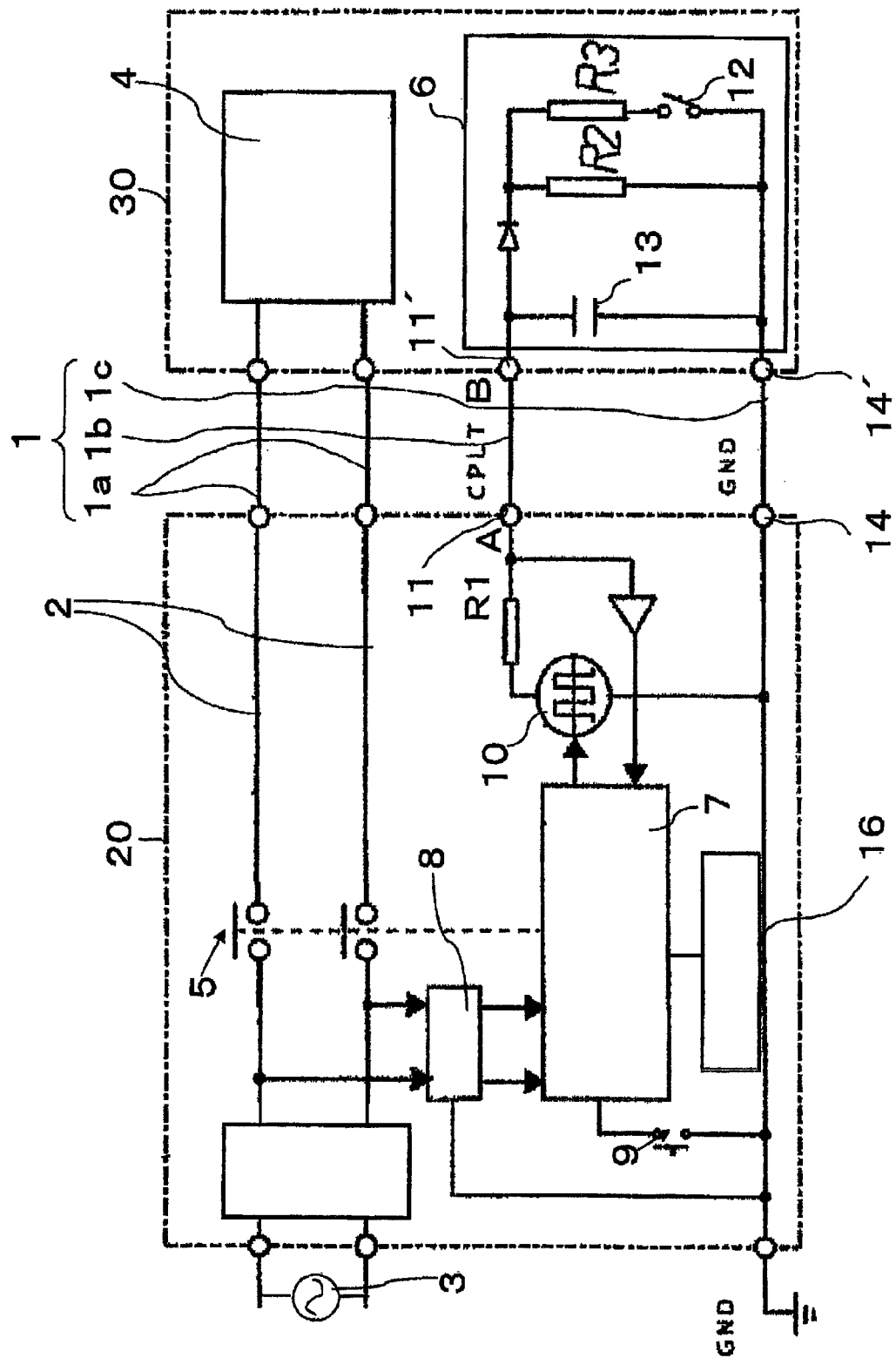
FIG. 1 is a schematic block diagram for charging start control.

One embodiment of the charging device for vehicles according to the present invention is a charging apparatus for vehicles which charges a vehicle provided with a charging control circuit via a charging cable, including a charging control device which controls electrical charging to the vehicle by transmitting a charging control signal to the charging control circuit on the vehicle side, a charging control signal transmission restricting device which restricts transmission of the charging control signal, a resetting device which forcibly resets the charging control signal when said restriction on transmission of the charging control signal is withdrawn.

In another embodiment of the invention, relating to the above mentioned charging apparatus for vehicles, the charging control signal transmission restricting device has a function to restrict the transmission of the charging control signal to the charging control circuit on the vehicle side by control of a restricting device after connection with the vehicle via the charging cable.

In another embodiment of the invention, relating to the above mentioned charging apparatus for vehicles, the restricting device is a timer control device which allows electrical charging at a set-up time.

In another embodiment of the invention, relating to the above mentioned charging apparatus for vehicles, the restricting device is a computer for control which configures a control function to perform temporary stop and restart of electrical charging, said control function repeating said start and stop of electrical charging alternately.

Another embodiment of the present invention is a charging apparatus for vehicles which charges a vehicle provided with a charging control circuit via a charging cable, including; a charging control device which controls electrical charging to the vehicle by transmitting a charging control signal to the charging control circuit on the vehicle side, a charging control signal transmission restricting device which restricts transmission of the charging control signal, a resetting device which forcibly resets the charging control signal when a predetermined condition is fulfilled.

Effect of the Invention

In the charging apparatus for vehicles according to the present invention, thanks to the configuration including a charging control device which controls electrical charging to the vehicle by transmitting a charging control signal to the charging control circuit on the vehicle side, a charging control signal transmission restricting device which restricts transmission of the charging control signal, and a resetting device which forcibly resets the charging control signal when restriction on transmission of the charging control signal is withdrawn, when restriction on transmission of the charging control signal due to the timer control function or due to the function to temporarily stop and restart electrical charging is withdrawn, the charging control signal is forcibly reset immediately, therefore even if the vehicle having the sleeping mode function is connected with the charging apparatus for vehicles, it is achievable to charge the vehicle together with the timer function or the function to temporarily stop and restart electrical charging, without physically disconnecting and reconnecting the charging cable by an operator.

Description of Illustrated Embodiment

Hereinafter the embodiments of the present invention will be explained.

FIG. 1 is a schematic block diagram illustrating the condition of mutual connection between a vehicle 30 and a charging apparatus 20 for vehicles corresponding to Mode 3 (the mode in which it is required to include the charging control device which transmits a charging control signal (CPLT) to a charging control circuit on the vehicle side as a control device on the charging apparatus side connected with the vehicle at charging) by using a charging cable 1. The charging cable 1 is configured with a power cable 1a which supplies electrical power, an information cable (communication cable) 1b which transmits a charging control signal, and an earth cable 1c. The power cable 1a is connected with a charging electrical line 2 provided with an earth leakage breaker (ELB) in the charging apparatus 20 for vehicles, and it charges electrical power from an AC electric source 3 to an in-vehicle battery 4 via a charging apparatus on the vehicle side through the charging cable 1. A relay 5 for ON-OFF control of electricity is installed on the charging electrical line 2.

Reference number 7 shows a charging control portion of the charging apparatus, and a power source 8 which is an AC-DC converting device is installed in the charging control portion 7.

In the charging control portion 7, a charging control signal terminal 11 is installed via an oscillator 10 and a resistor R1. Potential of the charging control signal terminal (potential of point A) is inputted into the charging control portion 7.

The oscillator 10 which exchanges the charging control signal (CPLT) to/from a charging control circuit 6 of the vehicle side oscillates the charging control signal with a predetermined duty ratio (pulse length/pulse cycle). The duty ratio of the charging control signal is determined according to a charging capacity of the charging control apparatus, a kind of charging cables or the like.

An electrical receipt allowing switch 12 connected with a resistor R3 in series, a resistor R2, and a capacitor 13 are mutually connected in parallel between a charging control signal terminal 11' and a earth terminal 14'. The electrical receipt allowing switch 12 is controlled by the charging control circuit 6 of the vehicle side. As the duty ratio (pulse length/pulse cycle) becomes larger, a larger charging electrical current can be supplied. Therefore, the charging control circuit 6 of the vehicle side controls the charging electrical current to the in-vehicle battery 4 by reading the duty ratio of the charging control signal outputted from the oscillator 10.

Figure 2:
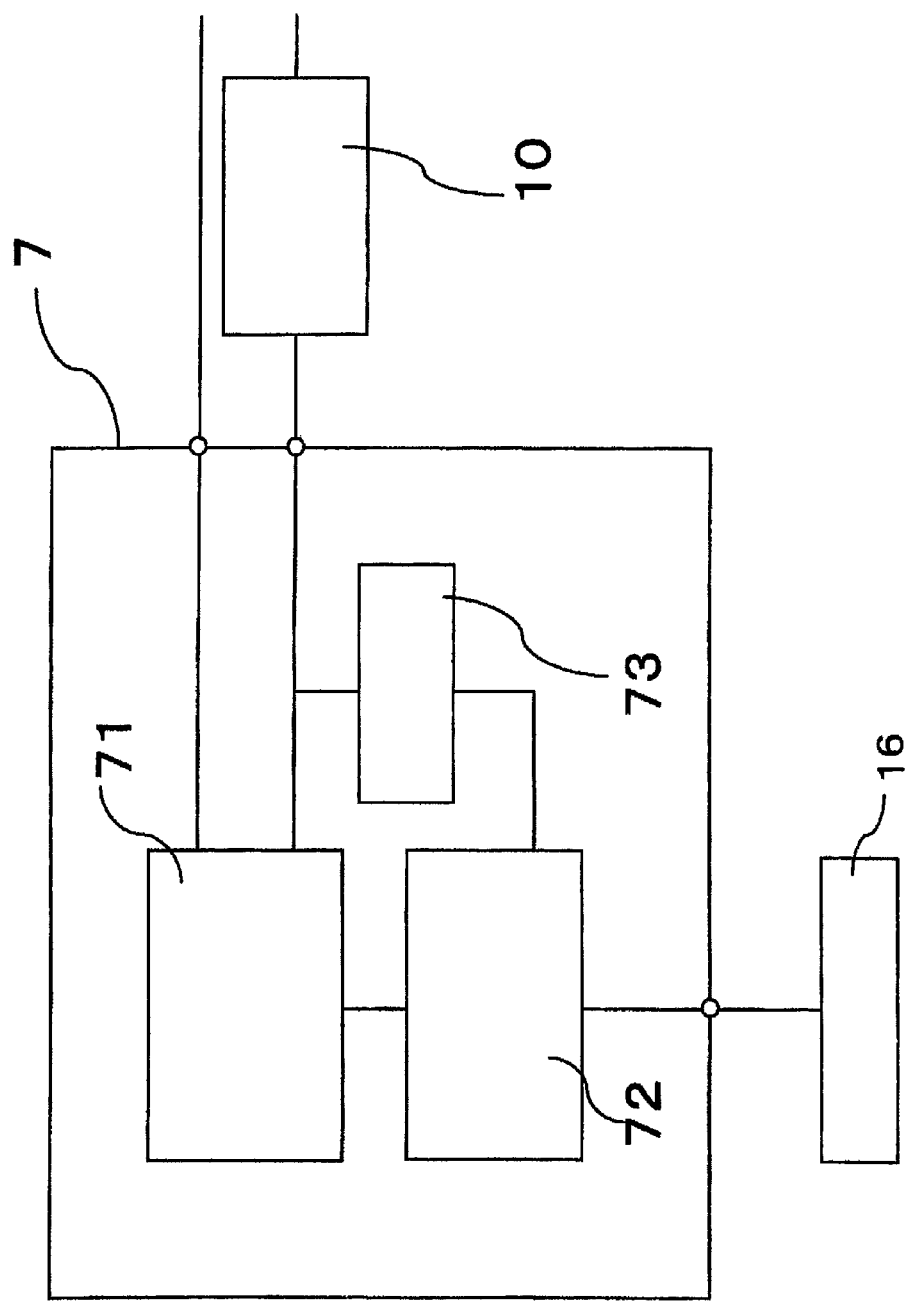
FIG. 2 is a schematic block diagram of the charging control portion according to the present invention.
Figure 3:
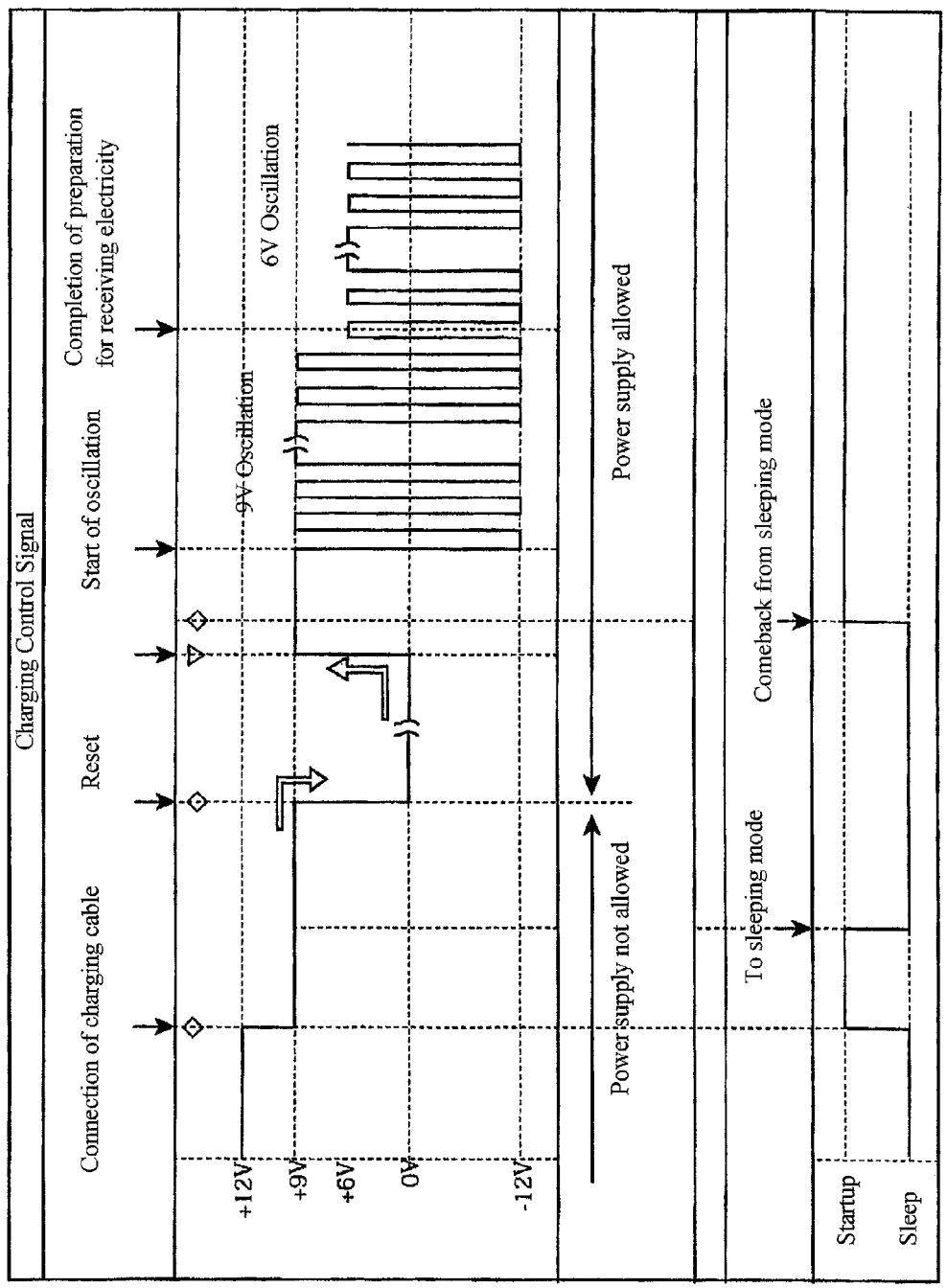
FIG. 3 is a graph showing variation of the potential of point A of FIG. 1.
Figure 4:
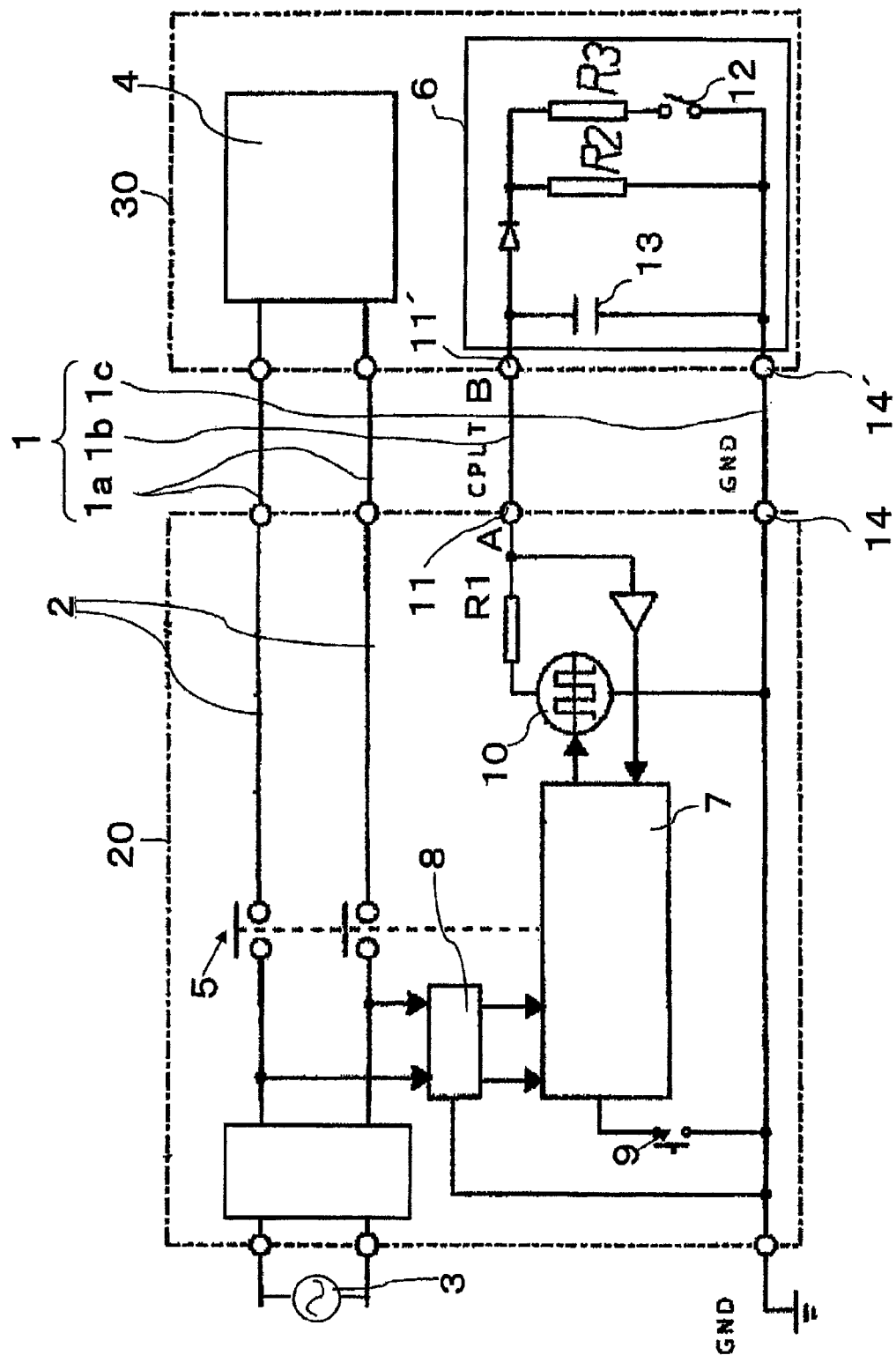
FIG. 4 is a schematic block diagram relating to the ordinary charging start control.
Figure 5:
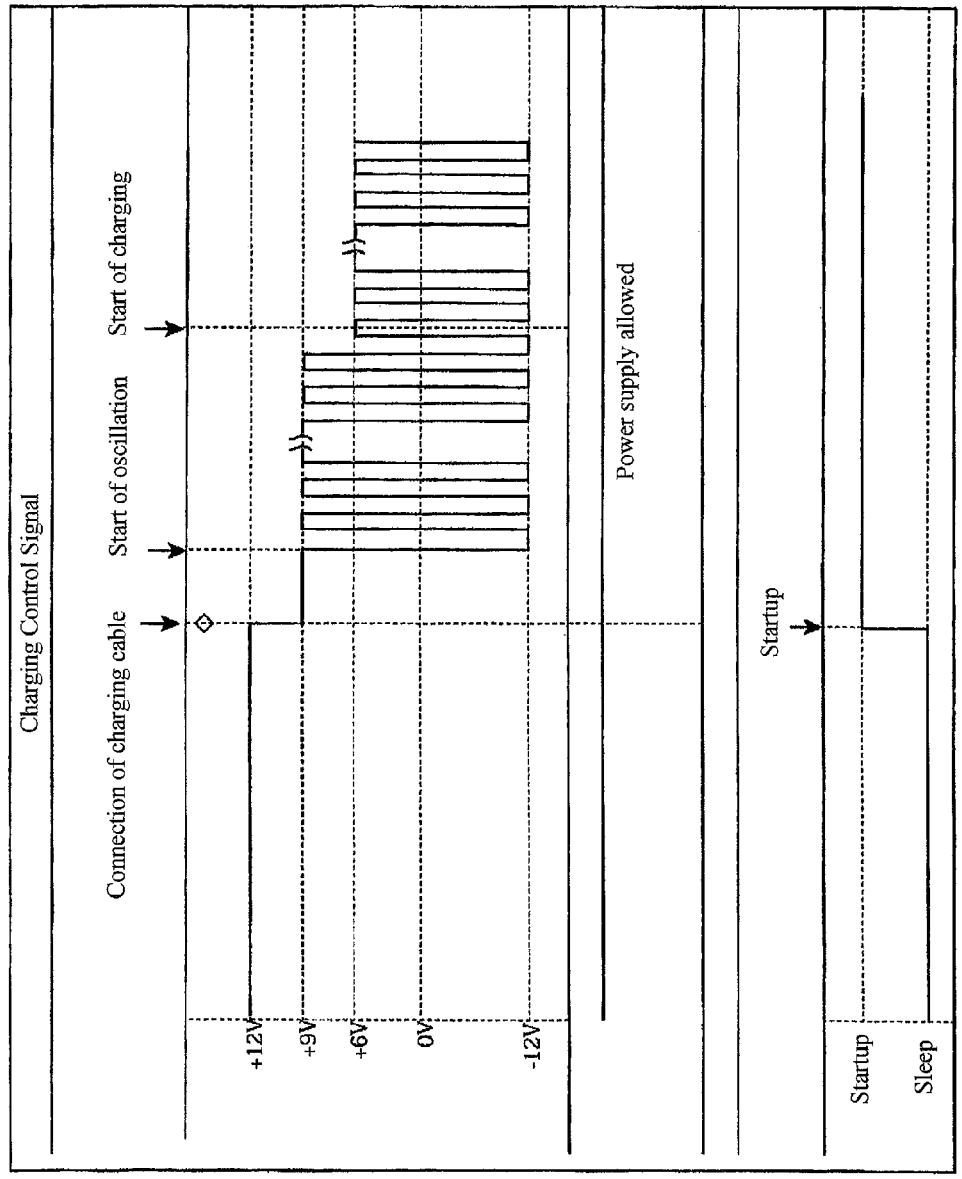
FIG. 5 is a graph showing variation of the potential of point A of FIG. 4.

As shown in FIG. 2, the charging control portion 7 is provided with a charging control device 71 which performs charging start control to the vehicle 30 by transmitting the charging control signal, a charging control signal transmission restricting device 72 which restricts transmission of the charging control signal, and a resetting device 73 which forcibly resets the charging control signal.

In the charging apparatus for vehicles according to the present invention, if the charging cable 1 is not connected with the vehicle 30, the charging control signal transmitted from the charging control device 71 is adjusted such that potential at the charging control signal terminal 11 becomes 12V, and if the charging cable 1 is connected with the vehicle 30 corresponding to Mode 3, the potential at the charging control signal terminal 11 is lowered to 9V by reduction of voltage due to resistance of the resistor R2 installed in the charging control circuit 6 of the vehicle side.

The charging control portion 7 can detect mutual connection between the charging cable 1 and the vehicle 30 corresponding to Mode 3, then the charging control portion 7 makes the oscillator 10 oscillate, thereby making 9V oscillating status. When the charging control signal with 9V oscillation enters into the vehicle side, the electrical receipt allowing switch 12 enclosed in the charging control circuit 6 of the vehicle side is turned on. Consequently, the voltage of the charging control signal becomes 6V with oscillation by reduction of voltage due to resistance of the resistor R3 which is the other resistor enclosed in the charging control circuit 6 of the vehicle side, thereby completing preparation for receiving electric power.

In this condition, the charging control portion 7 outputs an ON signal to the relay which opens or closes the charging electrical line 2, then charging to the in-vehicle battery 4 starts within a range of transmittable electrical current controlled by the charging control circuit 6 of the vehicle side according to the pulse signal. While a frequency of the pulse varies according to the power supply stations, the voltage and the duty ratio are standardized. Further, the charging apparatus for vehicles displays to inform that electrical charging starts according to the pulse signal with 6V oscillation.

As shown in FIG. 2, the charging control device 71 of the charging control portion 7 is connected with the charging control signal transmission restricting device 72. The charging control signal transmission restricting device 72 performs the control function to output or stop the restricting signal to the charging control device 71, after connection of the charging cable, and according to a restricting signal relating to starting electrical charging at the preset time, which is transmitted from a restricting device 16 configured with a timer control device or the like enclosed in the charging apparatus 20 for vehicles. That is, in the condition that the charging control signal transmission limiting device 72 outputs the restricting signal to the charging control device 71, the charging control device 71 does not transmit the charging control signal, therefore electrical charging to the vehicle 30 cannot start. For example, since a control signal informing "prohibition of electrical charging" is outputted by the timer control device up to the charging start time, the charging control signal transmission restricting device 72 keeps transmitting the restricting signal to the charging control device 71. Therefore, even if the charging control device 71 detects mutual connection between the vehicle 30 corresponding to Mode 3 and the charging cable 1 according to the potential variance from 12V to 9V, the charging control device 71 cannot make the oscillator 10 start to oscillate Since the timer control device outputs a control signal informing "allowance of electrical charging" at the charging start time, the charging control signal transmission restricting device 72 withdraws the restricting signal to the charging control device 71. Therefore, the charging control device 71 can make the oscillator 10 oscillate, so that electrical charging starts.

As the restricting device 16, it can be a control computer for the system which performs a temporary charging stop & re-start control to repeat stop and re-start of electrical charging alternatively for charging vehicles in turns. For example, it can be a charging system connected with a plurality of vehicles, which can charge the plurality of the vehicles at the same time. If a number of the vehicles to be charged is small, continuous charging is achievable. If a number of vehicles to be charged is so large to exceed the contract electrical capacity, the control computer controls electrical charging of each charging apparatus for vehicles not to exceed the contract electrical capacity by temporarily stopping electrical charging to a part of the vehicles connected.

If a power source such as solar energy generation is utilized, since production of electricity varies according to sunshine, the control computer is planned to temporarily stop and re-start electrical charging according to variance of production of electricity.

When the charging control signal transmission restricting device 72 of each charging apparatus 20 for vehicles detects the control signal of "prohibition of charging" transmitted by the control computer, the charging control signal transmission restricting device 72 transmits the restricting signal to the charging control device 71. Thereby it is controlled such that the charging control device 71 temporarily stops transmission of the charging control signal, and electrical charging to each vehicle 30 temporarily stops.

In the case that vehicles having the sleep mode function is connected with the charging apparatus 20 for vehicles which performs the above mentioned control, if electrical charging does not start within a predetermined period of time after the vehicle 30 detects connection with the charging cable 1 (for example, the charging control signal is not oscillated by the oscillator 10), the charging apparatus 20 for vehicles stops electrical power supply to the charging control circuit 6 on the vehicle side in order to prevent an auxiliary buttery battery of the vehicle 30 from running out.

The present invention is characterized in that when the restricting signal according to the control function such as the timer function or the function to temporarily stop and re-start electrical charging is withdrawn, and thereby restriction on transmitting the charging control signal from the charging control device 71 is withdrawn, the electrical charging can be performed together with the control function such as the timer function or the function of temporary stop and re-start of charging, even if it charges the vehicle 30 with the sleep mode function, by installing a resetting device 73 which performs the function to forcibly reset the potential of point A (a charging control signal), that is, to change the potential of point A from 9V to 0V, then from 0V to 9V as shown in FIGS. 1 and 2.

When the charging control signal transmission restricting device 72 withdraws the restricting signal, thereby removing restriction on transmitting the charging control signal from the charging control device 71, the physical work such as disconnecting and re-connecting the charging cable 1 can be simulated by performing the function such that the resetting device 73 forcibly resets the potential of point A (a charging control signal), that is, to change the potential from 9V to 0V then from 0V to 9V.

As mentioned above, when the potential of point A (a charging control signal) changes from 9V to 0V, physical disconnection of the charging cable 1 is simulated. In this case, since the charging cable 1 is physically connected, it is connected with the resistor R2 of the charging control circuit 6 of the vehicle side. Therefore, relating to the charging control signal from the charging control portion 7, the potential of point A (a charging control signal) becomes 9V by reduction of voltage due to resistance of the resistor R2 and the resistor R1 which are connected in series.

Accordingly the charging control portion 7 can recognize that the charging cable is connected with the vehicle 30 corresponding to Mode 3 by the change of the potential of point A from 0V to 9V.

Since the charging control signal transmission restricting device 72 withdraws the restricting signal to the charging control device 71, thereby removing restriction on transmitting the charging control signal, the charging control device 71 makes the oscillator 10 oscillate, which makes 9V oscillation status. When the charging control signal of 9V is inputted into the charging control circuit 6 of the vehicle side, the electrical receipt allowing switch 12 enclosed is turned on. Consequently, voltage of the charging control signal becomes 6V by reduction of voltage due to resistance of the resistor R3 enclosed in the charging control circuit 6 on the vehicle side, so that preparation to receive electrical power completes. In this condition, the charging control apparatus outputs the ON signal to the relay 5 which opens and closes the charging electrical line 2, then electrical charging to the in-vehicle battery 4 re-starts.

In the above mentioned embodiment, when the charging control signal transmission restricting device 72 withdraws the restricting signal, the resetting device 73 performs resetting function. However, it is also possible that the resetting device 73 performs resetting function within a certain period of time after the charging control signal transmission restricting device 72 withdraws the restricting signal.

The resetting device 73 can also perform the resetting function in the case that electrical charging does not start within a predetermined period of time after the oscillator 10 starts 9V oscillation, in other word, the potential of point A (a charging control signal) does not oscillate with 6V within the predetermined period of time.

As mentioned above, the resetting device 73 temporarily makes the potential of point A (a charging control signal) 0V, then return to the original potential, as the resetting function, when electrical charging re-starts after the sleep mode of the vehicle.

The restricting device 16 can temporarily stop electrical charging when temperature of the charging apparatus 20 for vehicles goes up.

While it is explained that the charging control device 71, the charging control signal transmission restricting device 72 and the resetting device 73 are installed in the charging control portion 7 in the above mentioned embodiment, the charging control portion can be configured with an integrated circuit (IC) or the like, and the function of the charging control device 71, the charging control signal transmission restricting device 72 and the resetting device 73 can be performed by programs incorporated in the integrated circuit.

While the resetting device 73 performs the resetting function when the restricting signal from the charging control signal transmission restricting device 72 is withdrawn in the above mentioned embodiment, it is also possible that the charging control portion 7 has a judging device, and the resetting device 73 forcibly resets the charging control signal when the judging device judges satisfaction of a predetermined condition.

As the predetermined condition, it can be exemplifies that in the case of stop of the electrical power source 3 of the charging apparatus 20 for vehicles, the judging device detects the re-start of supplying electricity when the electrical power source 3 re-starts the electrical power supply. When the predetermined condition is fulfilled, the resetting device 73 can forcibly resets the charging control signal, thereby re-starting electrical charging. In this case, it is preferable to automatically detect occurrence of other problems before re-start of electrical charging.

1 Charging cable
1a Power cable
1b Information cable (Communication cable)
1c Earth cable
2 Charging electrical line
3 AC power source
4 In-vehicle battery
5 Relay
6 Charging control circuit
7 Charging control portion
71 Charging control device
72 Charging control signal transmission restricting device
73 Resetting device
8 Power source
9 Start switch
10 Oscillator
11, 11' Charging control signal terminal
12 Electrical receipt allowing switch
13 Capacitor
14, 14' Earth terminal
15 Switch
16 Restricting device
20 Charging apparatus for vehicles
30 Vehicle

The invention claimed is:

1. A charging apparatus for vehicles which charges a vehicle provided with a charging control circuit via a charging cable, comprising;
   a charging control device which controls electrical charging to the vehicle by transmitting a charging control signal to the charging control circuit on the vehicle side,
   a charging control signal transmission restricting device which restricts transmission of the charging control signal, and
   a resetting device which forcibly resets the charging control signal when said restriction on transmission of the charging control signal is withdrawn.

2. The charging apparatus for vehicles according to claim 1, wherein the charging control signal transmission restricting device has a function to restrict the transmission of the charging control signal to the charging control circuit on the vehicle side by control of a restricting device after connection with the vehicle via the charging cable.

3. The charging apparatus for vehicles according to claim 2, wherein the restricting device is a timer control device which allows electrical charging at a set-up time.

4. The charging apparatus for vehicles according to claim 2, wherein the restricting device is a computer for control which configures a control function to perform temporary stop and restart of electrical charging, said control function repeating said start and stop of electrical charging alternately.

5. A charging apparatus for vehicles which charges a vehicle provided with a charging control circuit via a charging cable, comprising;
   a charging control device which controls electrical charging to the vehicle by transmitting a charging control signal to the charging control circuit on the vehicle side,
   a charging control signal transmission restricting device which restricts transmission of the charging control signal, and
   a resetting device which forcibly resets the charging control signal when a predetermined condition is fulfilled.

* * * * *